May 7, 1946.  R. CHILTON  2,399,853
BALANCED HYDRAULIC CLUTCH
Filed Sept. 13, 1943
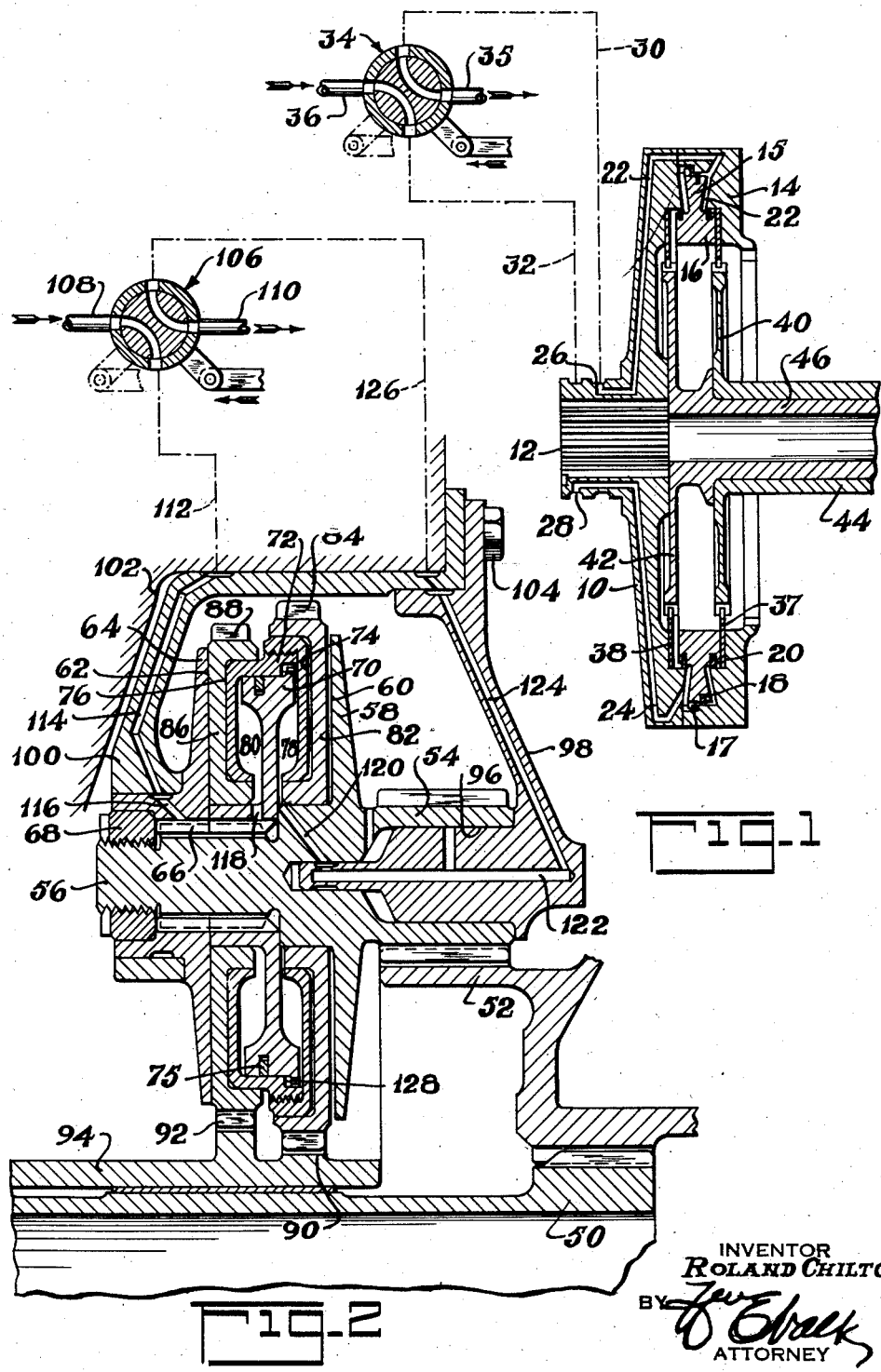
INVENTOR
ROLAND CHILTON
BY
ATTORNEY Patented May 7, 1946

2,399,853

UNITED STATES PATENT OFFICE 2,399,853

BALANCED HYDRAULIC CLUTCH

Roland Chilton, Ridgewood, N. J., assignor to Wright Aeronautical Corporation, a corporation of New York Application September 13, 1943, Serial No. 502,381

6 Claims. (Cl. 192—87)

This application is a continuation-in-part of applicant's copending application Serial No. 492,165, filed June 23, 1943. The invention relates to rotating hydraulic clutches or brakes and is particularly directed to such a clutch or brake in which the action of centrifugal force on the rotating fluid produces no net clutching or braking effort.

In conventional rotating clutches comprising a rotating piston and cylinder assembly the piston is actuated to enforce engagement of the clutch or brake upon application of the fluid pressure to the cylinder. When the fluid pressure is cut off the centrifugal force acting on the fluid tends to prevent retraction of the piston and disengagement of the clutch or brake until the fluid has drained from the cylinder. In order to permit quick disengagement of the clutch or brake it is common practice to provide a fluid leakage vent out of the cylinder but this necessarily results in a continuous flow of fluid through the cylinder behind the piston while the clutch or brake is engaged. With this construction when engine oil is used as the actuating fluid the entire quantity of engine oil may be repeatedly circulated through the clutch or brake. This may cause a considerable accumulation of sludge in the cylinder behind the piston which may prevent retraction of the piston when the oil pressure is cut off.

It is an object of this invention to provide a rotating piston and cylinder assembly in which the above difficulties resulting from the effect of centrifugal force on the actuating fluid have been eliminated. It is a further object of this invention to provide a rotating piston and cylinder assembly in which there is no net clutching or braking effort as a result of the centrifugal force acting on the actuating fluid.

Specifically, the invention comprises a double acting piston and cylinder assembly in which fluid pressure is applied to either side of the piston to provide positive fluid actuation of the piston in either direction. With this construction the effect of centrifugal force on the actuating fluid on one side of the piston balances the effect of centrifugal force on the actuating fluid on the other side of the piston. There then is no need for the conventional provision for a continuous flow of oil through the cylinder. In the present invention only the small amount of oil displaced from each side of the piston, once for each piston operation, enters the cylinder and this amount of oil is quite insignificant as compared to the continual circulation of oil through the conventional vented cylinder construction. Another advantage of the present invention is that the full oil pressure is available for actuating a piston in both directions thereby minimizing any sticking tendency of the piston.

Other objects of the invention will become apparent upon reading the annexed detailed description in connection with the drawing in which:

Fig. 1 is an axial section through one modification of the invention, and

Fig. 2 is an axial section through a second modification.

Referring to Fig. 1, 10 designates a clutch housing member having a hub portion 12 which is adapted to be drivably splined to a drive shaft (not shown). The clutch housing member 10 is provided with a cover member 14 and these two members together comprise an annular cylinder in which is fitted the stepped annular piston 15 having a pressure plate portion 16. The combined piston and pressure plate member is provided with sealing rings 18 and 20 as illustrated and an axial slidable splined drive 17 is provided between the piston and the clutch housing. Passages 22 and 24 communicate respectively with the right and left hand sides of the piston and with connecting grooves 26 and 28 in the hub 12. This hub operates in a bearing (not shown) to which oil lines 30 and 32 supply oil pressure under the control of the valve 34.

Assuming this system to be full of oil (but without external pressure) it will be seen that the centrifugal force generated in the rotating oil ducts 22 and 24, which deliver oil to the opposite sides of the piston 15, will be equal and opposite so that this centrifugal force is balanced and produces no tendency to move the combined piston pressure plate member. The valve 34 is arranged to supply oil pressure from the line 36 to either the oil line 30 or 32 while venting the other to a line 35, thereby moving the piston pressure plate member to one end or the other of the annular cylinder formed by the clutch housing. Clutch plates 37 and 38 are respectively disposed between one side or the other of the pressure plate 16 and the adjacent side of the clutch housing. In the position shown in Fig. 1 the valve 34 has applied pressure to the left side of the piston 15 through the ducts 32 and 24 thereby engaging the clutch plate 37 and between the pressure plate 16 and the adjacent side of the clutch housing and simultaneously freeing the other clutch plate 38. Upon rotation of the valve 34 to the dotted line position, oil pressure is supplied through ducts 30 and 22 to the right side of the piston 15 to engage the clutch plate 38 between the piston pressure plate portion and the left side of the clutch housing. These clutch plates 37 and 38 are respectively splined to driving discs 40 and 42 rigid respectively with an outer hollow shaft 44 and an inner shaft 46.

The above described clutch is illustrated and described in my aforementioned application as forming a part of a multi-speed transmission in which the clutch is used to transfer the drive from the shaft 44 to the shaft 46 and vice versa. If desired this clutch construction could be used to directly provide a two-speed drive by gearing each clutch plate 37 and 38 to a single driven shaft through gears providing different speed drive ratios. Fig. 2 illustrates a somewhat modified form of clutch providing such a two-speed drive.

The modification illustrated in Fig. 2 is designed as a two-speed drive for an aircraft engine supercharger but, obviously, the clutch is not limited to this specific use. In this modification the engine crankshaft extension 50 is provided with a gear 52 meshed with a pinion 54 integral with a layshaft 56. A radially extending plate 58 having a friction face 60 is formed integral with the shaft 56 and an opposed friction face 62 is formed on a plate 64 splined to the shaft 56 at 66. A nut 68 serially clamps the plate 64 and a central disc member 70 in position against a shoulder on the layshaft 56. The central disc 70 is splined to the shaft 56 adjacent to the spline connection of the plate 64. Surrounding the central disc member 70 is a composite double-sided annular piston member 72 having opposed external friction faces 74 and 76. A seal ring 75 is disposed between the annular piston member and the central disc member 70 whereby these members provide opposed cylindrical spaces or cells 78 and 80.

Between the opposed friction faces 60 and 74 there is disposed a clutch plate 82 integral with a high speed gear 84 and similarly between the friction faces 62 and 76 there is disposed a clutch plate 86 integral with a low speed gear 88. The gears 84 and 88 are meshed with pinions 90 and 92 respectively formed on a shaft 94 which may be the impeller shaft of a supercharger. The shaft 56 is supported at one end on a journal bearing 96 projecting from a web portion 98 and at the other end in a bearing 100. The journal 96 and bearing 100 are both supported from the housing structure 102 by bolts 104.

A control valve 106 has a primary oil pressure connection 108 and a vent connection 110. This valve in its illustrated full line position supplies oil pressure from the supply conduit 108 to conduit 112, passage 114 in the support for bearing 100, radial passages 116, thence along the splines 66 to radial passages 118 communicating with the cylindrical space or pressure cell 80. Simultaneously, the cylindrical space or pressure cell 78 is vented to the connection 110 through passages 120 connecting with axial passage 122 in the journal 96 and thence through the passage 124 in the journal-supporting web to conduit 126 and the valve 106. Therefore, when the valve 106 is in its full line position fluid pressure is applied to the cell 80 while the cell 78 is vented, thereby moving the piston 72 to the left to engage the clutch plate 86 and its associated low speed gear 88. When the valve 106 is moved to its dotted line position the cell 80 is vented while fluid pressure is applied to cell 78 engaging the clutch plate 82 and its high speed gear 84 and simultaneously disengaging the low speed gear 88.

The piston 72 is provided with a driving spline connection 128 with the central disc member 70, whereby friction driving torque is transmitted from each pair of friction faces 60 and 74 or 62 and 76 to the associated clutch plates 82 or 86 respectively depending on which clutch plate is engaged. That is, each clutch plate when engaged is provided with a friction drive from both of its opposed friction surfaces.

In Fig. 2 the clutch is illustrated as forming part of a two-speed transmission. Although the transmission has been described with only one such clutch it seems clear that a plurality of layshafts 56 may be provided each with a similar clutch assembly geared to the impeller shaft 94.

The clutch operation of the modification illustrated in Fig. 2 is essentially the same as the clutch illustrated in Fig. 1. Thus, the centrifugal forces acting on the fluid in the opposed pressure cells 78 and 80 are equal and opposite in their effect on the piston 72 whereby these forces exert no resultant force on the piston. This balance, however, is upset whenever external hydraulic pressure is applied to the cells 78 or 80 by the valve 106, thereby moving the piston 72 to engage either the clutch plate 82 or 86 depending on the direction of operation of the valve. Also, as in the embodiment of Fig. 1, the only oil flow through the clutch during engagement will be that due to inadvertent leakage and a small quantity of oil displaced upon each piston actuation. As previously stated this quantity of oil is quite small and, therefore, is not likely to produce sludge deposits behind the piston as in the prior art construction. Also in Fig. 2 as in Fig. 1 the piston is positively actuated by hydraulic pressure in both directions so that this pressure is available to displace any sludge which might accumulate and tend to interfere with movement of the piston.

Essentially the clutches of Figs. 1 and 2 differ only in that in Fig. 1 the piston element is reciprocal within an annular cylinder whereas in Fig. 2 the annular cylinder comprises the movable piston member which surrounds and reciprocates relative to an axially fixed member. It seems clear, however, that the operation and the advantages of each embodiment are similar. It should be noted that the term "piston" as used in the above description and in the appendant claims is intended to designate the fluid pressure actuated element of a piston-cylinder assembly.

While I have described my invention in detail in its present preferred embodiment, it will be obvious to those skilled in the art, after understanding my invention, that various changes and modifications may be made therein without departing from the spirit or scope thereof. I aim in the appended claims to cover all such modifications and changes.

I claim as my invention:

1. In a rotary clutch, a pair of clutch plates, mechanism for engaging one or the other of said clutch plates comprising a rotatable clutch housing providing an annular channel-shaped cylindrical space, an annular piston slidably disposed within said cylindrical space with said clutch plates disposed on opposite sides of said piston member for engagement between said piston member and the adjacent wall of said cylindrical space, and means operable to selectively apply fluid pressure against one side or the other of said piston for effecting clamping engagement of one or the other of said clutch plates.

2. A rotary hydraulically operated friction clutch comprising a pair of clutch plates, a pressure plate therebetween frictionally engageable with either of said plates and having an extension comprising an annular piston, a rotatable housing having opposed friction faces engageable by respective clutch plates and an annular recess in which said combined piston and pressure plate element is fitted for axial movement, means to apply hydraulic pressure to either side of said piston to engage respectively either of said clutch plates.

3. In a rotary clutch, a rotatable clutch housing having an annular cylindrical space, an annular piston member slidably disposed within said space and comprising an inner and an outer annular portion, a pair of clutch plates each respectively disposed between one side of said piston and the adjacent wall of said housing, and means selectively operable to apply fluid pressure to one side or the other of one of said piston portions for clamping one or the other of said clutch plates between the other piston portion and the adjacent side of said housing.

4. In a rotary clutch, a rotatable clutch housing having an annular cylindrical space, an annular piston member slidably disposed within said space and having an inner and an outer annular portion, a clutch plate disposed for clamping engagement between one side of one of said piston portions and the adjacent wall of the clutch housing, and means selectively operable to apply fluid pressure to one side or the other of the other of said piston portions to effect engagement or release of said clutch plate.

5. In a rotary clutch, a rotatable clutch housing having an annular cylindrical space, an annular piston slidably disposed within said space, said piston having an inner and an outer annular portion, a clutch plate disposed between one of said annular piston portions and the adjacent wall of said space and adapted to be clamped therebetween, and means selectively operable to effect application of fluid pressure to one side or the other of the other of said annular piston portions to clamp or release said clutch plate.

6. In a rotary clutch, a pair of clutch plates, mechanism for engaging one or the other of said clutch plates comprising a rotatable clutch housing providing an annular inwardly opening channel-shaped cylindrical space, an annular axially movable piston disposed within said cylindrical space with said clutch plates each respectively disposed on one side of said piston member between said piston member and the adjacent end wall of said cylindrical space, and means operable for selectively admitting fluid pressure to one end or the other of said cylindrical space for effecting clamping engagement of one or the other of said clutch plates.

ROLAND CHILTON.